United States Patent [19]
Inazuka

[11] Patent Number: 5,563,671
[45] Date of Patent: Oct. 8, 1996

[54] PARALLAX CORRECTING APPARATUS OF A REAL IMAGE TYPE OF VIEWFINDER

[75] Inventor: Masahiro Inazuka, Tokyo, Japan

[73] Assignee: Asahi Kogaku Kogyo Kabushiki Kaisha, Tokyo, Japan

[21] Appl. No.: 538,974

[22] Filed: Oct. 5, 1995

[30] Foreign Application Priority Data

Oct. 7, 1994 [JP] Japan ................................. 6-270704

[51] Int. Cl.⁶ ................................................. G03B 13/14
[52] U.S. Cl. ........................... 396/377; 359/872; 396/386
[58] Field of Search ................................. 354/201, 221, 354/224, 225, 155; 359/840, 857, 872, 862

[56] References Cited

U.S. PATENT DOCUMENTS

| | | |
|---|---|---|
| 4,206,991 | 6/1980 | Kobori et al. ........................... 354/225 |
| 4,926,208 | 5/1990 | Teramoto et al. ........................ 354/225 |
| 4,978,199 | 12/1990 | Mukai et al. ............................ 354/224 |
| 5,130,855 | 7/1992 | Mukai et al. ............................ 354/224 |
| 5,258,792 | 11/1993 | Suzuki et al. ........................... 354/221 |
| 5,270,758 | 12/1993 | Morooka ................................. 354/224 |
| 5,345,287 | 9/1994 | Taguchi ................................... 354/221 |
| 5,452,034 | 9/1995 | Ichikawa et al. ........................ 354/221 |
| 5,481,324 | 1/1996 | Sekine ..................................... 354/225 |

*Primary Examiner*—A. A. Mathews
*Attorney, Agent, or Firm*—Greenblum & Bernstein P.L.C.

[57] ABSTRACT

A parallax correcting apparatus of a viewfinder that includes a roof mirror which is provided within the viewfinder. The roof mirror includes a pair of reflecting surfaces which are perpendicular to one another. The parallax correcting device includes a path which includes an optical axis of the viewfinder so that incident light is introduced to one of the reflecting surfaces. The parallax correcting apparatus is provided with an adjusting device to adjust the position of the roof mirror in a direction perpendicular to an optical axis such that the parallax effects are minimized or substantially eliminated.

14 Claims, 6 Drawing Sheets

PARALLAX CORRECTING APPARATUS OF A REAL IMAGE TYPE OF VIEWFINDER

BACKGROUND OF THE INVENTION

1. Field of the Invention

The present invention relates to a parallax correcting apparatus for a real image type of viewfinder which may be incorporated in a lens-shutter type of camera.

2. Description of Related Art

Some viewfinders, of conventional real image type, incorporated in cameras are provided with an erecting optical system including a roof mirror which is positioned between the objective optical system and the eyepiece optical system in an optical path of the viewfinder. The roof mirror has a pair of reflecting surfaces which are perpendicular to one another. The roof mirror has the same function as a roof prism. The degree of parallax in a viewfinder, with respect to a photographing optical system, varies depending upon the position where the roof mirror is fixed. Therefore, the roof mirror is normally designed to be fixed in a position within the viewfinder in order to minimize parallax.

In the conventional manufacturing process for a viewfinder, the roof mirror is not precisely fixed in a predetermined position where parallax is minimal since fixing the roof mirror in an exact position where parallax is minimized, in practice, quite difficult. For this reason, it cannot be said, for a conventional camera having a real image type of viewfinder, that parallax is rendered sufficiently small.

SUMMARY OF THE INVENTION

The primary object of the present invention is to provide a parallax correcting apparatus for a real image type of viewfinder that makes it possible to finely adjust the fixing position of the roof mirror during the manufacturing process of the view finder.

To achieve the object mentioned above, according to one aspect of the present invention, there is provided a parallax correcting apparatus of a viewfinder that includes a roof mirror which is provided in the viewfinder and includes a pair of reflecting surfaces which are perpendicular to each other, a light path which includes an optical axis of the viewfinder and introduces light to one of the reflecting surfaces, and a device for adjusting a position of the roof mirror in a direction perpendicular to the optical axis.

Preferably, the adjusting device includes a support member supporting the roof mirror, at least one guiding surface which extends normal to the optical axis, the support member coming into slidable contact with the guiding surface, and a device for moving the support member along the guiding surface.

The moving device may include an adjusting screw which is associated with the support member.

Preferably, the parallax correcting apparatus further includes a leaf spring for biasing the supporting means against the guiding surface.

Preferably, the parallax correcting apparatus further includes a pair of coil springs for biasing the supporting means in a direction parallel to the guiding surface.

The moving device may include an adjusting screw which is associated with the support member and moves the support member along the guiding surface against a biasing force of the pair of coil springs when the adjusting screw is rotated.

According to another aspect of the present invention, there is provided a parallax correcting apparatus of a viewfinder that includes an erecting optical system including a roof mirror, a support member for supporting the roof mirror, and a device for accommodating a finder optical system including the erecting optical system. The accommodating device is provided with a guiding surface which extends normal to an optical axis of the finder optical system, and the support member comes into slidable surface. Also provided are a leaf spring contact with the guiding for biasing the support member in a direction where the support member comes into pressing contact with the guiding surface, pair of coil springs for biasing the support member in a direction parallel to the guiding surface, and a device for moving the support member along the guiding surface against a biasing force of the pair of coil springs.

The viewfinder may be a real image type of viewfinder.

Preferably, the parallax correcting apparatus further includes a recessed portion formed on the support member, and an engaging portion which is formed integral with the leaf spring and engaged with the recessed portion.

The moving device may include an adjusting screw supported by a part of the housing, a tip of the adjusting screw coming into contact with the support member.

The viewfinder may be incorporated in a lens-shutter type of camera in such a manner that an objective optical system of the finder optical system is placed above a photographing optical system of the camera, and where the support member is slidable on the guiding surface in a vertical direction of the camera.

The objective optical system may include a fixed lens and a movable lens which is moved along an optical axis of the finder optical system relative to the fixed lens so as to vary a magnifying power of the finder optical system.

According to yet another aspect of the present invention, there is provided a parallax correcting apparatus of a real image type of viewfinder including an objective optical system and an eyepiece optical system. The parallax correcting apparatus includes an erecting optical system including a roof mirror which is placed in an optical path between the objective optical system and the eyepiece optical system, a support member for supporting the roof mirror, a housing for accommodating the objective optical system, the eyepiece optical system, and the erecting optical system. Also provided are a guiding surface which is fixed to the housing and extends normal to the optical light path, the support member coming into slidable contact with the guiding surface, a leaf spring for biasing the support member in a direction where the support member comes into pressing contact with the guiding surface, a pair of coil springs for biasing the support member in a direction parallel to the guiding surface and a device for adjusting a position of the support member with respect to the guiding surface by moving the support member along the guiding surface against a biasing force of the pair of leaf springs.

The present disclosure relates to subject matter contained in Japanese patent application No. 6-270704 (filed on Oct. 7, 1994) which is expressly incorporated herein by reference in its entirety.

BRIEF DESCRIPTION OF THE DRAWINGS

The invention will be described in detail below with reference to the accompanying drawings, in which.

DESCRIPTION OF THE PREFERRED EMBODIMENT

Figure 1:
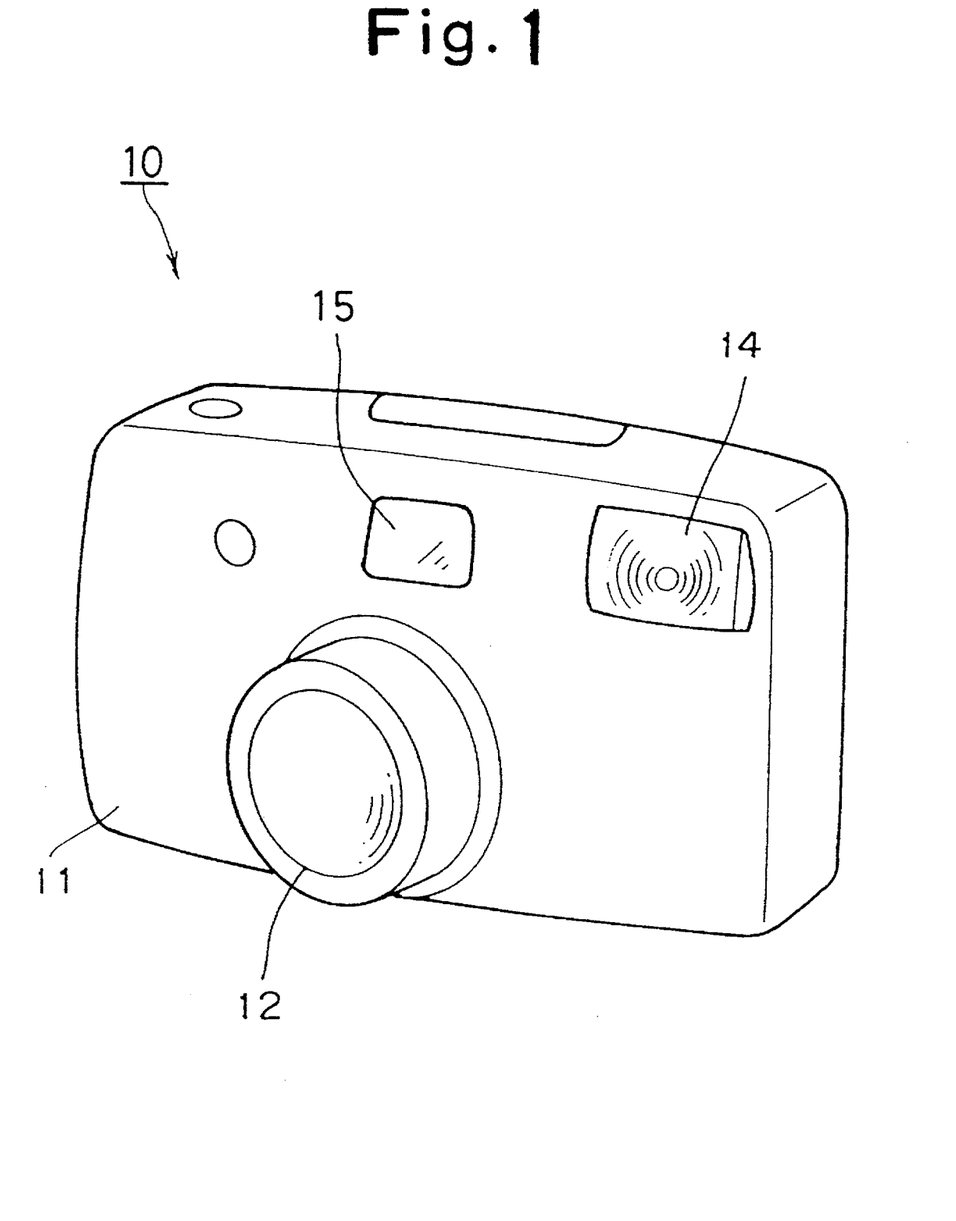
FIG. 1 is a perspective view of a lens-shutter type of camera provided with a parallax correcting apparatus of an embodiment of the present invention.

FIG. 1 shows a lens-shutter type of camera 10 including a parallax correcting apparatus of an embodiment to which the present invention is applied. A photographing optical system 12 is provided at the mid-front of the camera body 11. At the front of the camera body 11, above the photographing optical system 12, is a finder objective window 15. A strobe 14 is also provided at the front of the camera body 11.

Figure 2:
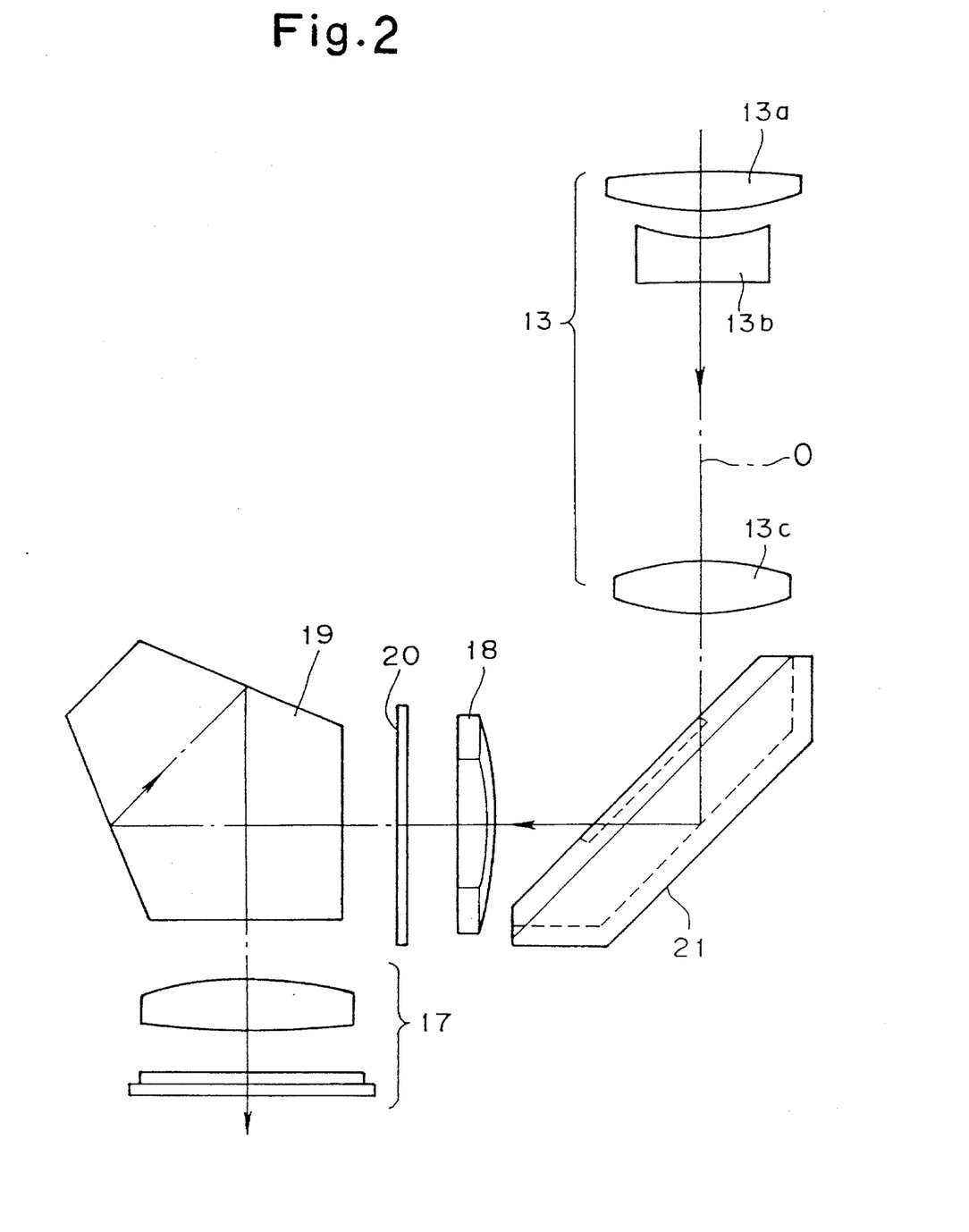
FIG. 2 is a schematic plan view of a real image type of zoom viewfinder optical system having the same parallax correcting apparatus as the camera shown in FIG. 1.

FIG. 2 shows the real image type of zoom viewfinder optical system which is incorporated in the camera 10. This viewfinder optical system is comprised of an objective optical system 13, a roof mirror 21, a condenser lens 18, a focusing plate 20, a pentagonal prism 19, an eyepiece optical system 17, in respective order from the object side along an optical axis O of the viewfinder optical system.

The objective optical system 13 is comprised of three lens groups, i.e., a first lens group 13a, a second lens group 13b, and a third lens group 13c. The first lens group 13a faces towards the finder objective window 15 and is immovable along the optical axis. The second and third lens groups 13b and 13c are guided along the optical axis O so as to effect zooming by varying the distance therebetween. Behind the third lens group 13c is the roof mirror 21 that functions as an erecting optical system. The roof mirror 21 includes a pair of reflecting surfaces 21b (see FIGS. 5 and 6) which are perpendicular to each other. The light which passes through the objective optical system 13 is reflected by the roof mirror 21 to change an object image to a proper erecting image. The light reflected by the roof mirror 21 is converged by the condenser lens 18 to form an object image on the focusing plate 20. The object image is subsequently reflected by the pentagonal prism 19 and is observed through the eyepiece optical system 17.

Figure 3:
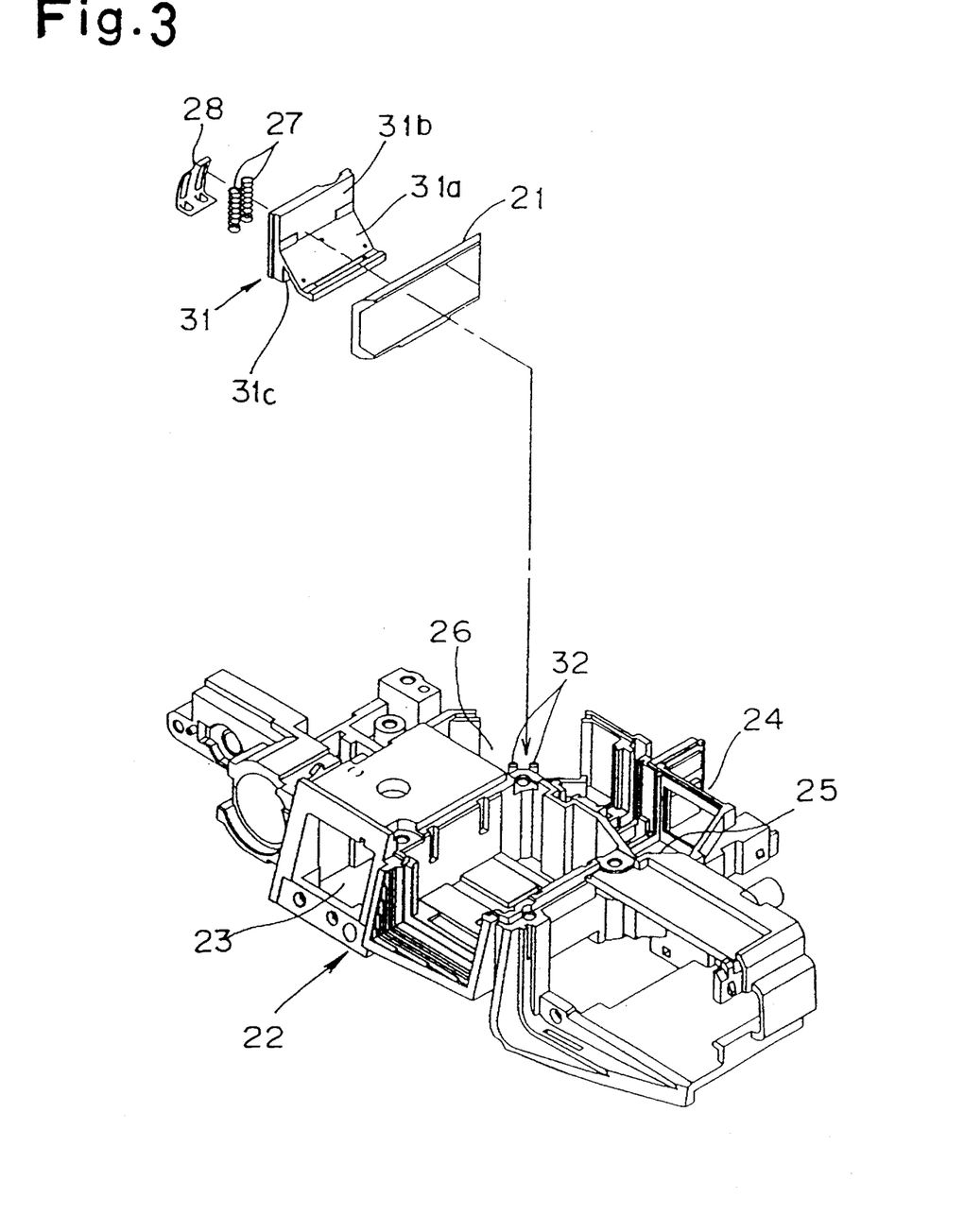
FIG. 3 is a perspective view of a finder housing and an exploded perspective view of some of the components of the parallax correcting apparatus to be fixed to the housing.
Figure 4:
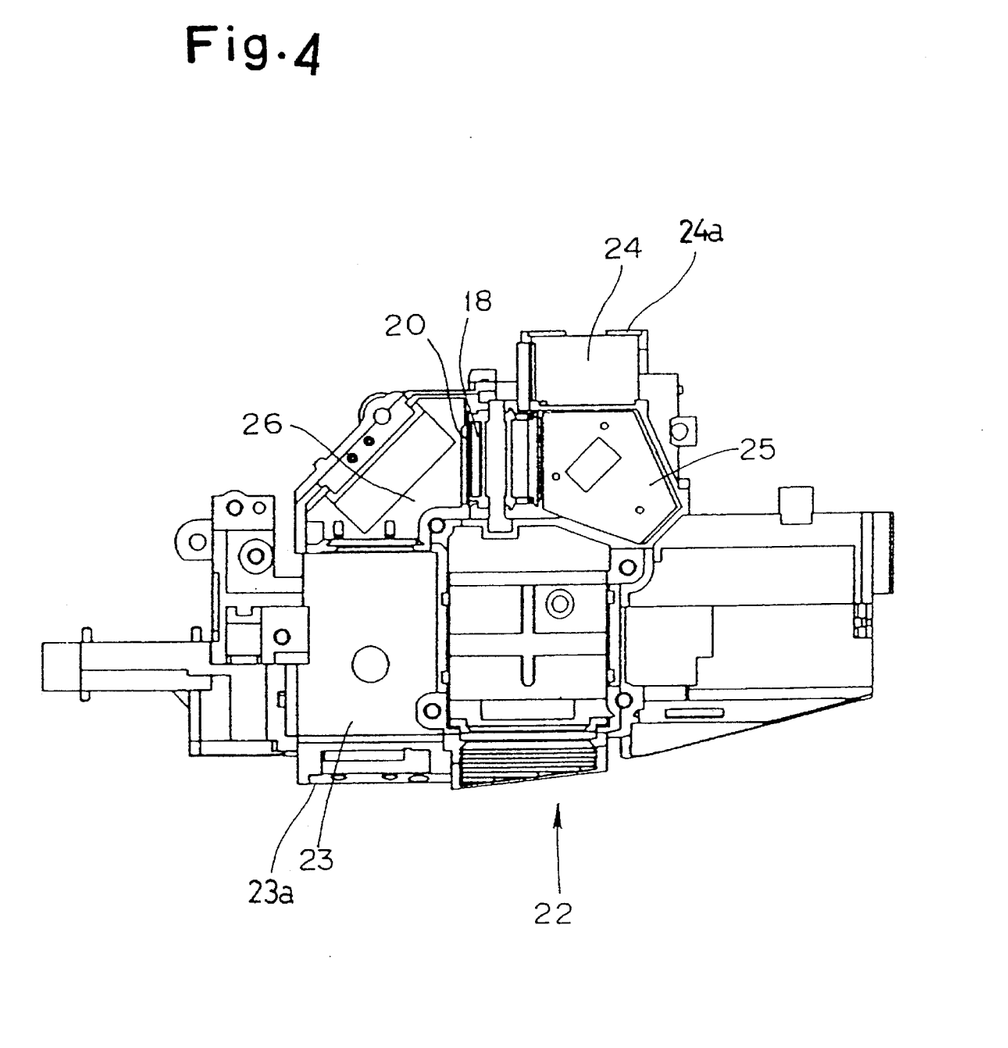
FIG. 4 is a schematic plan view of the finder housing shown in FIG. 3.

FIGS. 3 and 4 show a housing 22 provided in the camera body 11. The housing 22 accommodates the objective optical system 13, the eyepiece optical system 17, and the roof mirror 21. The objective optical system 13 is accommodated in and supported by a first accommodating section 23, the front part 23a of the first accommodating section 23 being placed to correspond to the finder objective window 15. The eyepiece optical system 17 is accommodated in, and supported by, a second accommodating section 24, the rear part 24a of the second accommodating section 24 being placed to correspond to a finder eyepiece window (not shown) through which a photographer looks into the viewfinder. The pentagonal prism 19 is accommodated in and supported by a third accommodating section 25 formed immediately in front of the second accommodating section 24. The roof mirror 21 is accommodated in and supported by a fourth accommodating section 26 which is formed behind the first accommodating section 23 on the left side of the third accommodating section 25 in FIG. 4. The roof mirror 21 is placed in the fourth accommodating section 26 in such a manner that the angle defined by an incident light upon the roof mirror 21 and an outgoing light reflected on the roof mirror 21 equals approximately 90 degrees.

Figure 5:
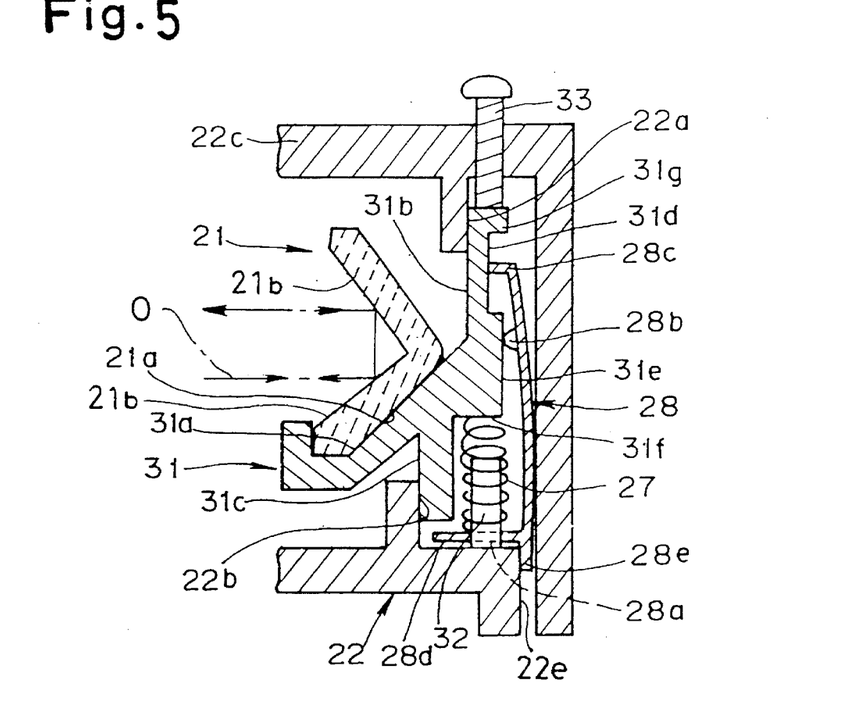
FIG. 5 is a cross-sectional view of the parallax correcting apparatus, showing the state when the roof mirror is properly installed in the finder housing.
Figure 6:
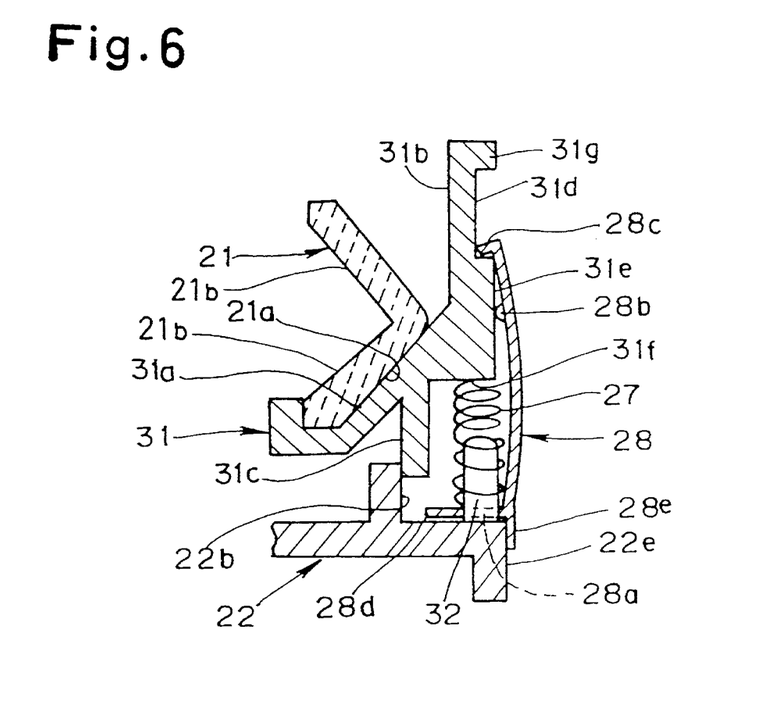
FIG. 6 is a cross-sectional view of the parallax correcting apparatus, showing the state when the roof mirror is placed in the finder housing in a temporary position.
Figure 7:
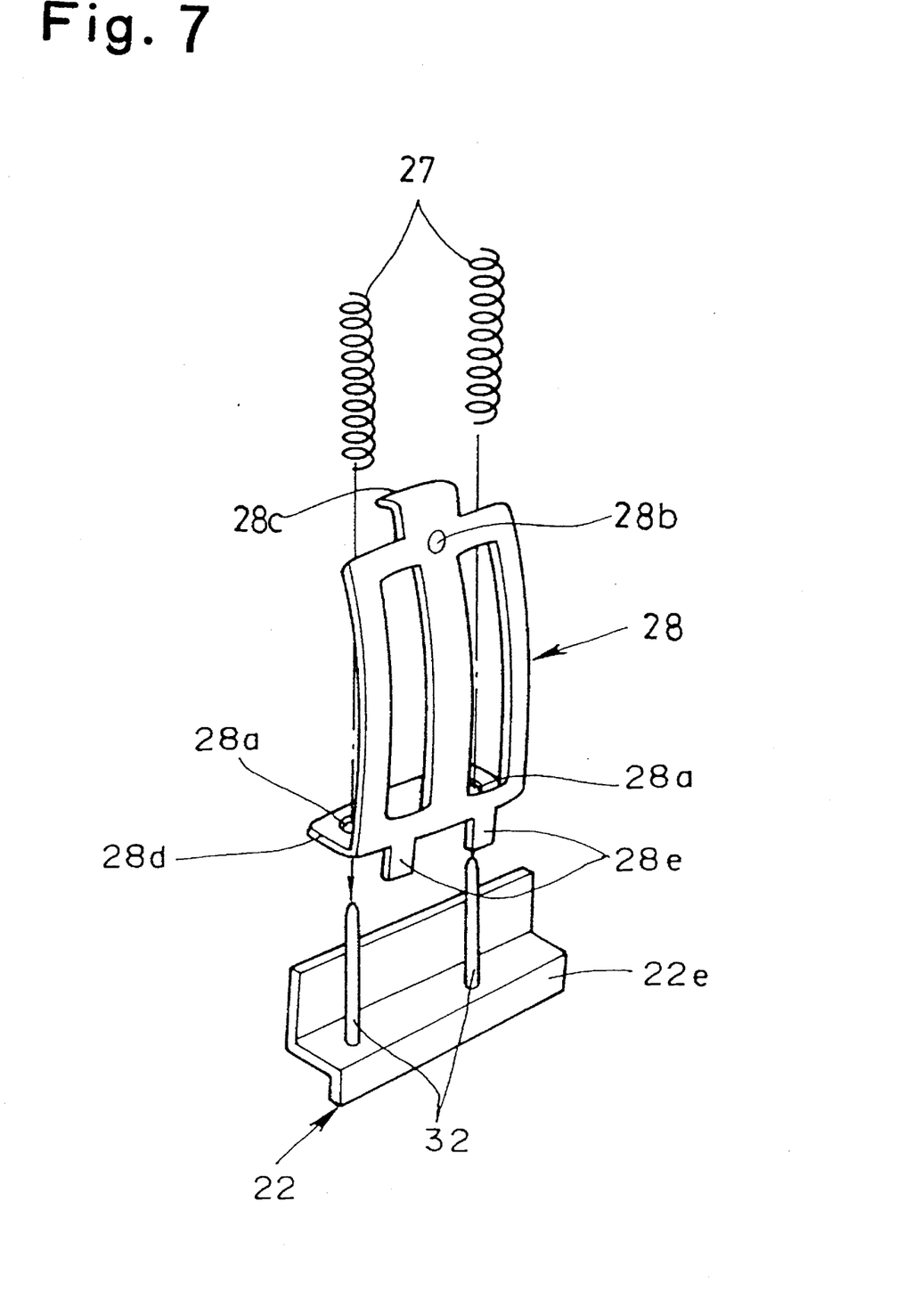
FIG. 7 is an exploded perspective view of some of the components of the parallax correcting apparatus, showing a pair of coil springs, a leaf spring, and a pair of supporting pins fixed on the finder housing.

The roof mirror 21 and the peripheral members thereof will be explained below in detail with reference to FIGS. 3 through 7. FIG. 5 shows the state when the roof mirror 21 is properly installed in the housing 22. FIG. 6 shows the state when the roof mirror 21 is placed at a temporary position before the roof mirror 21 is fixed in place. FIG. 7 shows a pair of coil springs (i.e., second biasing means) 27 and a leaf spring (i.e., first biasing means) 28 each biasing the roof mirror 21 in a predetermined direction.

The roof mirror 21 is supported by a supporting member 31. The supporting member 31 is made of a synthetic resin and includes an inclined surface 31a, a first contacting surface 31b which is connected to the upper edge of the inclined surface 31a and extends upwardly, and a second contacting surface 31c which is formed below the inclined surface 31a and extends downwardly. The roof mirror 21 is fixed to the inclined surface 31a in such a manner that a rear-lower surface 21a of the roof mirror 21 is adhered to the inclined surface 31a with an adhesive or the like (not shown). The first contacting surface 31b comes into slidable contact with a first guiding surface 22a formed on a covering member 22c fixed to the housing 22 on the fourth accommodating section 26. The second contacting surface 31c comes into slidable contact with a second guiding surface 22b formed on the housing 22. Each of the first and second guiding surfaces 22a and 22b extends normal to the optical axis O. With this structure, the supporting member 31 is movable, upwardly and downwardly, along the first and second guiding surfaces 22a and 22b.

The supporting member 31 further includes a recessed portion 31d formed on the opposite side of the first contacting surface 31b, a flat surface 31e formed immediately below the recessed portion 31d, and an abutting surface 31f which is connected with the lower edge of the flat surface 31e and extends horizontally in the direction of the rear-lower surface 21a of the roof mirror 21. As shown in FIGS. 3 and 7, a pair of supporting pins 32 each extending upwardly are formed integral with the housing 22 in the fourth accommodating section 26. The leaf spring 28 is provided at the bottom thereof with a fixing plate 28d. The fixing plate 28d includes a pair of holes 28a which correspond to the pair of supporting pins 32. The leaf spring 28 is firstly connected to the housing 22 by putting the pair of holes 28a on the supporting pins 32, and the pair of coil springs 27 are subsequently put on the pair of supporting pins 32. The upper tips of the coil springs 27 come into contact with the abutting surface 31f. With this arrangement, the supporting member 31 is biased by the coil springs 27 upwardly along the first and second guiding surfaces 22a and 22b, respectively. The leaf spring 28 is provided on an upper portion thereof with a hemispherical-shaped raised portion 28b raised in the direction of the roof mirror 21. The raised portion 28b comes into pressing contact with the flat surface 31e of the supporting member 31, and thus the supporting member 31 is biased by the leaf spring 28 in the direction where the first and second contacting surfaces 31b and 31c are brought into pressing contact with the first and second guiding surfaces 22a and 22b, respectively. The leaf spring 28 is provided at the bottom thereof with a pair of projections 28e each extending downwardly and coming into contact with a side wall portion 22e formed on the housing 22.

The leaf spring 28 is also provided at the upper end thereof with a claw (i.e., engaging portion) 28c which comes into contact with the recessed portion 31d. With this structure, in the state shown in FIG. 6 where the covering member 22c is not yet fixed to the housing 22, the supporting member 31 is placed at a temporary position where the claw 28c contacts the lower side of the recessed portion 31d while the pair of coil springs 27 are biasing the supporting member 31 upwardly. In this state, the claw 28c prevents the supporting member 31 from moving upwardly along the first and second guiding surfaces 22a and 22b.

On the other hand, in the state shown in FIG. 5 where the covering member 22c is fixed to the housing 22, the tip of an adjusting screw 33 provided through the covering member 22c comes into contact with an upper end 31g of the supporting member 31. In this state, the tip of the adjusting screw 33 presses the supporting member 31 downwardly against the biasing force of the pair of coil springs 27, and thereby the coil springs 27 are compressed to some degree and the claw 28c is placed about the middle of the recessed portion 31d.

The installing process of the roof mirror 21 to the housing 22 will be explained below. Firstly, the leaf spring 28 and the coil spring 27 are fitted on the supporting pin 32 in respective order. The leaf spring 28, once fitted on the supporting pin 32, does not move away from the supporting pin 32 since the pair of projections 28e come into contact with the side wall portion 22e.

Subsequently, the supporting member 31 is installed in place with the second contacting surface 31c coming into contact with the second guiding surface 22b and with the claw 28c engaging with the recessed portion 31d. FIG. 6 shows the state when the roof mirror 21 is placed at a temporary position. Thereafter, the covering member 22c is fixed to the housing 22.

When the covering member 22c is fixed to the housing 22, the lower tip of the adjusting screw 33 comes into contact with the upper end 31g of the supporting member 31, thereby the supporting member 31 is moved downwardly while the coil spring 27 is being compressed. Thereafter, the position of the roof mirror 21 is adjusted by being moved upwardly and downwardly along the first and second guiding surfaces 22a and 22b by means of operating or rotating the adjusting screw 33. In this adjustment, the vertical positions of an incident light and of a reflected light on the roof mirror 21, with respect to the objective optical system 13 and the like, can be finely adjusted so as to correct a parallax. In this parallax adjustment, first of all, both the photographing optical system 12 and the finder optical system are each set at its telephoto extremity. Thereafter, the adjusting screw 33 is adjusted by being rotated in such a manner that the image, focused on the focusing plate 20, of a certain photographing object distanced from the camera 11 by a predetermined distance (e.g., three meters) substantially matches the image of the same photographing object which is formed in the image area defined by the photographing optical system 12.

As can be understood from the foregoing, according to the present invention, the fixing position of the roof mirror 21 in the vertical direction is finely adjustable. Therefore, the roof mirror can be placed at a precise position and the parallax consequently becomes minimal or is substantially eliminated.

In the above embodiment, the adjusting screw 33 is placed above the supporting member 31 so as to press it downwardly against the biasing force of the coil spring 27. However, the present invention is not limited only to this specific arrangement. Any other adjusting members may be adopted to adjust the vertical position of the supporting member 31 as long as they have function to move the supporting member 31 upwardly and downwardly.

In the above embodiment, the roof mirror 21 is attached to the supporting member 31 by means of an adhesive. Instead of this arrangement, the roof mirror may be integrally formed integral with the supporting member 31 by making them both from a synthetic resin. In this case, the reflecting surface of the roof mirror may be formed by plating.

Instead of the roof mirror 21, a roof prism may be used in the above embodiment.

As can be seen from the foregoing, according to the present invention, the fixing position of the roof mirror can be finely and easily adjusted so as to minimize the effect of parallax or substantially eliminate it.

I claim:

1. A parallax correcting apparatus of a viewfinder, comprising:

a roof mirror provided in said viewfinder, said roof mirror including a pair of reflecting surfaces which are perpendicular to one another;

a light path which includes an optical axis of said viewfinder and introduces light to one of said reflecting surfaces; and means for adjusting a position of said roof mirror in a direction perpendicular to said optical axis.

2. The parallax correcting apparatus of claim 1, wherein said adjusting means comprises:

means for supporting said roof mirror;

at least one guiding surface which extends normal to said optical axis, said supporting means coming into slidable contact with said at least one guiding surface; and means for moving said supporting means along said guiding surface.

3. The parallax correcting apparatus of claim 2, wherein said moving means comprises an adjusting screw which is associated with said supporting means.

4. The parallax correcting apparatus of claim 2, further comprising first biasing means for biasing said supporting means against said guiding surface.

5. The parallax correcting apparatus of claim 4, further comprising second biasing means for biasing said supporting means in a direction parallel to said guiding surface.

6. The parallax correcting apparatus of claim 5, wherein said moving means comprises an adjusting screw which is associated with said supporting means and moves said supporting means along said guiding surface against a biasing force of said second biasing means when said adjusting screw is rotated.

7. A parallax correcting apparatus of a viewfinder, comprising:

an erecting optical system including a roof mirror;

means for supporting said roof mirror;

means for accommodating a finder optical system including said erecting optical system, wherein said accommodating means is provided with a guiding surface which extends normal to an optical axis of said finder optical system, said supporting means coming into slidable contact with said guiding surface;

a first biasing means for biasing said supporting means in a direction where said supporting means comes into pressing contact with said guiding surface;

a second biasing means for biasing said supporting means in a direction parallel to said guiding surface; and means for moving said supporting means along said guiding surface against a biasing force of said second biasing means.

8. The parallax correcting apparatus of claim 7, wherein said viewfinder is a real image type of viewfinder.

9. The parallax correcting apparatus of claim 7, further comprising:

a recessed portion formed on said supporting means; and an engaging portion which is formed integral with said first biasing means and engaged with said recessed portion.

10. The parallax correcting apparatus of claim 7, wherein said moving means comprises an adjusting screw supported by a part of said housing, a tip of said adjusting screw coming into contact with said supporting means.

11. The parallax correcting apparatus of claim 7, wherein said viewfinder is incorporated in a lens-shutter type of camera such that an objective optical system of said finder optical system is placed above a photographing optical system of said camera, and wherein said supporting means is slidable on said guiding surface in a vertical direction of said camera.

12. The parallax correcting apparatus of claim 11, wherein said objective optical system comprising a fixed lens and a movable lens which is moved along an optical axis of said finder optical system relative to said fixed lens so as to vary a magnifying power of said finder optical system.

13. The parallax correcting apparatus of claim 7, wherein said viewfinder includes an objective optical system, said objective optical system comprising a fixed lens and a movable lens which is moved along an optical axis of said finder optical system relative to said fixed lens so as to vary a magnifying power of a finder optical system of said view finder.

14. A parallax correcting apparatus of a real image type of viewfinder including an objective optical system and an eyepiece optical system, comprising:

an erecting optical system including a roof mirror disposed in an optical path of said viewfinder between said objective optical system and said eyepiece optical system;

means for supporting said roof mirror;

a housing for accommodating said objective optical system, said eyepiece optical system, and said erecting optical system;

a guiding surface which is fixed to said housing and extends normal to said optical light path, said supporting means coming into slidable contact with said guiding surface;

a first biasing means for biasing said supporting means in direction where said supporting means comes into pressing contact with said guiding surface;

a second biasing means for biasing said supporting means in direction parallel to said guiding surface; and means for adjusting a position of said supporting means with respect to said guiding surface by moving said supporting means along said guiding surface against a biasing force of said second biasing means.

* * * * *

UNITED STATES PATENT AND TRADEMARK OFFICE
CERTIFICATE OF CORRECTION

PATENT NO. : 5,563,671
DATED : October 8, 1996
INVENTOR(S) : Masahiro INAZUKA

It is certified that error appears in the above-indentified patent and that said Letters Patent is hereby corrected as shown below:

At column 7, line 9 (claim 7, line 11), delete "a".

At column 7, line 12 (claim 7, line 14), delete "a".

At column 8, line 26 (claim 14, line 16), delete "a".

At column 8, line 29 (claim 14, line 19), delete "a".
At column 8, line 26, after "in" insert --a--.
At column 8, line 30, after "in" insert --a--.

Signed and Sealed this

Thirteenth Day of May, 1997

*Attest:*

BRUCE LEHMAN

*Attesting Officer*     *Commissioner of Patents and Trademarks*